United States Patent [19]

Haner et al.

[11] 3,764,784

[45] Oct. 9, 1973

[54] REVERSIBLE RATE MULTIPLIER

[75] Inventors: Lambert Haner, Rocky River; John Allen Gill, Medina, both of Ohio

[73] Assignee: Antron Manufacturing, Inc., Cleveland, Ohio

[22] Filed: Mar. 30, 1972

[21] Appl. No.: 239,493

[52] U.S. Cl. .......................... 235/150.3, 235/92 EV

[51] Int. Cl. .......................... G06f 15/20

[58] Field of Search .................. 235/150.3, 92 DM, 235/92 EV, 194, 152, 150.52, 151.3; 307/220–222, 225, 229; 328/160, 161

[56] References Cited

UNITED STATES PATENTS

| | | | |
|---|---|---|---|
| 3,408,644 | 10/1968 | Kintner | 235/150.3 UX |
| 2,951,202 | 8/1960 | Gordon | 235/150.3 X |
| 3,230,353 | 1/1966 | Greene et al. | 235/150.3 X |
| 3,474,236 | 10/1969 | Batte | 235/150.3 |
| 3,564,594 | 2/1971 | Montalto, Jr. | 235/150.3 |

*Primary Examiner*—Joseph F. Ruggiero
*Attorney*—Robert B. Sundheim et al.

[57] ABSTRACT

A rate multiplier is provided for multiplying a pulse train by a calibration factor less than unity so that for a given number of input pulses the number of output pulses will be a fraction thereof in accordance with the calibration factor. The rate multiplier employs an up/down reversible counter having at least one decade of binary counting stages. The counting stages provide non-carry transitions which are passed as output pulses in dependence upon a selected calibration factor. The input pulse train may be unidirectional or bi-directional. The counter is controlled to count up or down in dependence upon the direction of the input pulse train. Logic circuits are employed for preventing an erroneous count from occuring when an input pulse train reverses its direction.

17 Claims, 8 Drawing Figures

REVERSIBLE RATE MULTIPLIER

This invention relates to the art of digital rate multipliers and, more particularly, to a rate multiplier that is bidirectional so that it may process pulse trains provided by a unidirectional or a bidirectional pulse source.

Digital rate multipliers for multiplying a train of pulses by a selectable calibration factor between zero and unity are well known. An example of such a prior art rate multiplier is found in the U.S. Pat. to M. A. Meyer et al U.S. Pat. No. 2,910,237. Such a rate multiplier employs a multi-stage binary counter, with the counting stages being cascaded. An input pulse train is applied to the first stage and this stage has two output circuits. One output circuit is internal and serves to provide carry transition pulses used to trigger the next succeeding binary stage. The other output circuit provides non-carry transition pulses which do not cause a succeeding counter stage to change state. It is the non-carry transitions that are passed by the binary counter to a calibration circuit for multiplying the input pulse train by a calibration factor between zero and unity. For example, it may be desired to provide five output pulses for each ten input pulses received by a rate multiplier. In such case, the calibration factor is 0.5. The calibration circuitry will be adjusted to pass five non-carry transitions for each ten pulses in the input pulse train.

Digital rate multipliers have many applications. For example, the input pulse train may be converted from a frequency to a number of pulses representative of actual engineering units, such as feet, meters, inches, etc. A typical example would be where a pulse generator, such as a tachometer, is coupled to a roll which rotates at an angular velocity dependent on the linear velocity of sheet material passing over the roll. Due to the diameter of the roll and intermediate gearing stages, ten output pulses may be provided by the pulse generator for every five feet of sheet material passing the measuring roll in a forward direction. The calibration circuitry for the rate multiplier may be adjusted for a calibration factor such as 0.5 so that for every ten pulses applied to the binary counter, only five output pulses are provided. This may be displayed with a visual indicator so that an operator may monitor the amount of sheet material in absolute units.

Digital rate multipliers known heretofore are unidirectional for multiplying pulses obtained from a unidirectional source. Thus, in the example above wherein the length of moving sheet material is determined, the pulse generator is assumed to be providing pulses on the basis that the sheet material is moving in a forward direction. If, however, through vibration or other factors the sheet material momentarily stops or reverses its direction of travel, backward direction pulses may be generated by the pulse generator and these pulses may be erroneously counted by the binary counter as if they were representative of sheet material moving in a forward direction.

The present invention is directed toward an improved digital rate multiplier which is reversible or bidirectional as opposed to the unidirectional digital rate multipliers discussed above. Consequently, the output pulses obtained from the digital rate multiplier constructed in accordance with the present invention will be absolute and thereby provide improved accuracy in the number of output pulses for all operating conditions, whether the conditions be forward, backward or include momentary double reversals in pulse directions.

The present invention contemplates that the digital rate multiplier include an up/down binary counter for counting a train of input count pulses. The counter employs a plurality of binary counting stages, each having an output circuit. The output circuits provide non-carry transitions which are mutually exclusive in time during a counting interval and are of a direction dependent upon the counting direction of the binary counter. It is also contemplated that a counter control means be provided for selectively conditioning the binary counter to count received count pulses in an up direction or in a down direction.

In accordance with one aspect of the present invention, the non-carry transitions of at least one of the binary stages are sensed for determining the number of such transitions during a count interval as well as for determining the direction of the transitions. A plurality of output pulses are provided corresponding in number to the sensed transitions in a first direction and the sensed transitions in a second direction. These output pulses may be provided on separate output circuits.

In accordance with another aspect of the present invention, the binary state of a selected one or more of the binary counting stages is sensed during the counting interval. A pulse passing gate is enabled whenever the selected stage or stages exhibit a given binary state pattern. When the pulse gate is enabled it serves to pass an input count pulse to an output circuit. The output circuit will then carry a train of output count pulses corresponding in number during a counting interval to the number of times the pulse gate is enabled.

In accordance with a more limited aspect of the invention as described in the immediately preceding paragraph, each time the binary counter is conditioned to change its counting direction, a blanking pulse of greater duration than that of an input count pulse is provided to inhibit the pulse gate from passing the next count pulse. This is done for purposes of eliminating erroneous counts during a reversal process so that an erroneous number of output pulses will not be passed by the pulse gate.

The primary object of the present invention is to provide an improved digital rate multiplier which functions to provide digital multiplication of a pulse train, which may be unidirectional or bidirectional.

It is a still further object of the present invention to provide improved accuracy in digital multiplication of pulse trains regardless of whether or not the pulse trains are provided by a unidirectional or a bidirectional pulse source.

It is a still further object of the present invention to improve the accuracy of multiplying digital signals in the form of a pulse train by a multiplying factor less than unity so that the product obtained is independent of the direction of the pulse train.

The foregoing and other objects of the present invention will become more readily apparent from the following description of the preferred embodiments of the invention as taken in conjunction with the accompanying drawings which are a part hereof and wherein.

Figure 1:
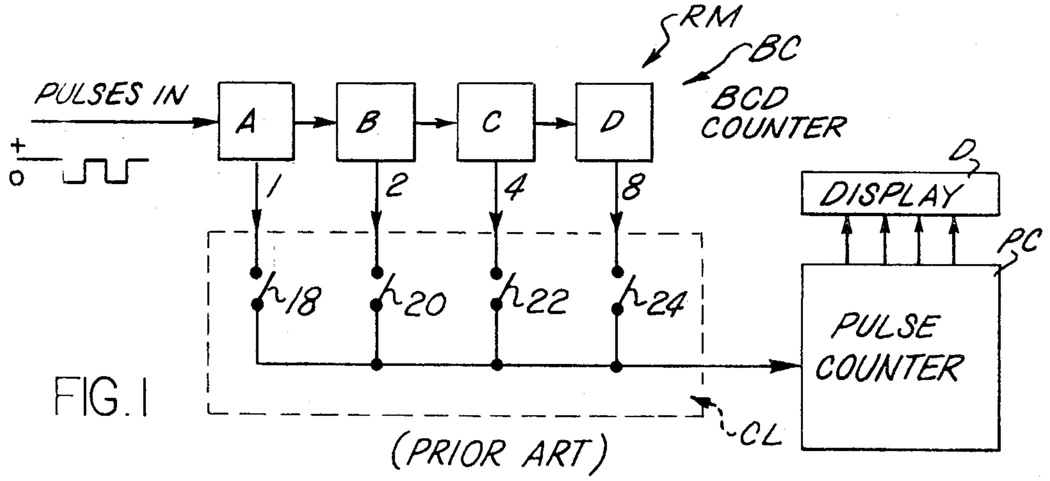
FIG. 1 is a block diagram illustration of a prior art digital multiplier.
Figure 2:
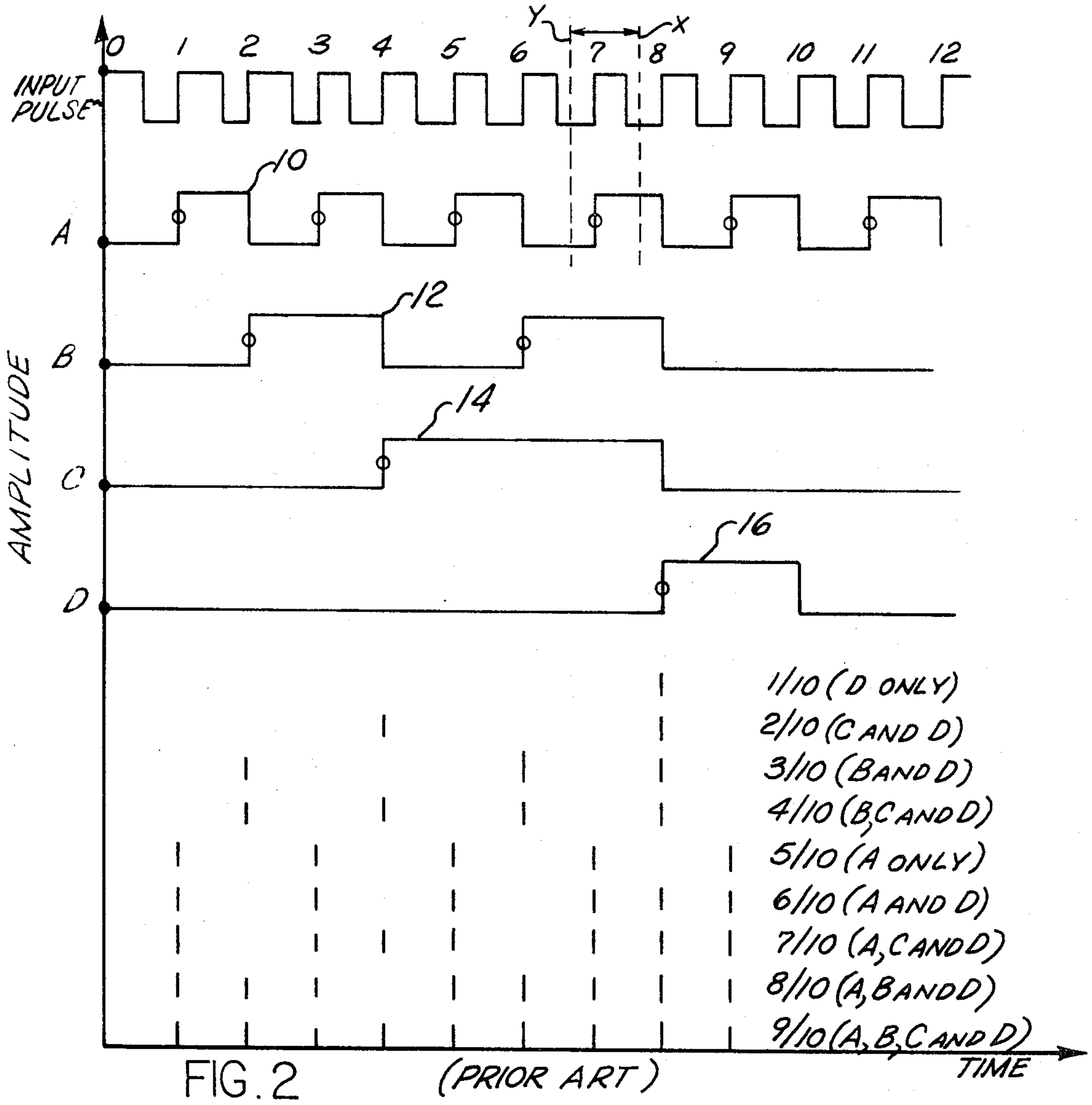
FIG. 2 is a graphical illustration showing various waveforms indicative of the operation of the rate multiplier illustrated in FIG. 1.

Referring now to the drawings wherein the showings are for purposes of illustrating preferred embodiments of the invention only and not for purposes of limiting same, FIGS. 1 and 2 respectively illustrate a prior art rate multiplier and its manner of operation. This prior art multiplier is described below for purposes of providing background information on such multipliers and for pointing out the disadvantages of such prior art, particularly with respect to the problems encountered with a bidirectional pulse stream.

The rate multiplier RM, as shown in FIG. 1, includes a BCD counter BC and a calibration circuit CL. Only one decade is shown, with the four binary counting stages being labelled A, B, C and D. Each counting stage has an output circuit connected to the calibration circuit and these output circuits have decimal weights of 1, 2, 4 and 8, respectively. For an input pulse stream, as shown in FIG. 2, the waveform of the signals appearing on the output circuits of stages A, B, C and D are shown, with respect to time, as waveforms 10, 12, 14 and 16 respectively. With reference to waveform 10, taken from the output of stage A, it will be noted that for ten input pulses there is provided five transitions from a binary 0 state to a binary 1 state. In the same period there are two such transitions in the waveform for the B stage, and one each in the waveforms for the C stage and the D stage. The leading edge of these pulses is waveforms 10, 12, 14 and 16 is circled and is known as the non-carry transition. The non-carry transition is the transition that does not cause the succeeding counter stage to change state. The BCD counter is constructed from cascaded binary counters, with each succeeding counter receiving its input counting pulse from a carry transition from the preceding binary counter. For example, whereas the leading edge of the first pulse in waveform 10 is a non-carry transition, the lagging edge (as the pulse changes from a binary 1 to a binary 0 level) corresponds with the carry transition which causes the succeeding binary counter stage B to change state from a binary 0 level to a binary 1 level, as shown in waveform 12.

The non-carry transitions occur singularly as there is no time coincidence between any of the non-carry transitions, as is noted from an inspection of FIG. 2. By detecting these transitions, from zero to nine pulses for every ten input pulses, a multiplication of the input pulse train may be obtained. For example, if the calibration for a particular problem to be solved is that for every ten input pulses provided by a sensor only five pulses should be passed, then the rate multiplier of FIG. 1 would be calibrated to multiply by a factor of 0.5. This is accomplished by closing switch 18 and leaving switches 20, 22 and 24 open. With switch 18 closed, only the non-carry transitions of waveform A are passed by the calibration circuit CL to suitable utilization means, such as a pulse counter PC (which may also be a BCD counter) for purposes of actuating a decimal display D. Display D incorporates, for example, a BCD to decimal converter, suitable driving circuitry and a visual readout, such as a figure eight Nixie tube. If, for example, an application required that six pulses be passed for every ten pulses provided by a pulse source, then the calibration circuit CL would be programmed when switches 18 and 24 closed to pass the non-carry transitions of waveforms A and D. Various calibration or multiplying factors may be obtained by closing different combinations of switches 18, 20, 22 and 24, as is shown in the lower portion of FIG. 2. The resolution obtained by such a rate multiplier may be increased by increasing the number of decades and calibration logic circuits employed. For a more detailed description of a rate multiplier circuit, reference may be made to the U. S. patent to M. A. Meyer et al. U.S. Pat. No. 2,910,237 which discloses a rate multiplier circuit employing a nine stage binary counter as opposed to the BCD counter shown herein.

Digital rate multipliers are frequently used for multiplying digital signals in the form of a pulse train where the absolute value of the quantity represented is a function of the pulse rate at any given time. Consequently, accuracy in pulse counting and multiplications is important. In the discussion given thus far, it has been assumed that the pulse generator is unidirectional with the pulses generated representing movement of, for example, sheet metal in one direction. Applications arise, however, where through vibration and other factors the sheet material may momentarily stop or even reverse its direction of movement and then commence its movement in a forward direction. In the digital rate multipliers known heretofore, such a bidirectional movement may result in an erroneous count.

An example of an erroneous count may be appreciated with reference to the waveforms of FIG. 2. Assume for the mement that only switch 18, in the calibration circuit CL of FIG. 1, is closed so that for ten input pulses only five output pulses are passed to the pulse counter PC, with each of these pulses corresponding with one of the five non-carry transitions of waveform 10. After the seventh input pulse, or at point X in the input pulse train, the status of the pulse counter PC is that it has received and counted four non-carry transitions. Assume, for example, that moving sheet material is being monitored by a pulse generator, such as a tachometer and that the sheet of material now reverses its direction of movement for an increment corresponding with the time from point X to point Y in FIG. 2. Since this time increment exceeds that necessary to generate a pulse the pulse generator will develop another pulse which would have corresponded with input pulse 8, a carry transition for decade stage A. If now the sheet material commenced movement in the forward direction by a distance corresponding to the time increment from point Y to point X, there will elapse sufficient time for the pulse generator to generate another pulse, i.e. pulse 9. This will result in a non-carry transition which is passed by the calibration logic circuit CL as an output pulse to the pulse counter. Consequently, the pulse counter will now have received a total of five pulses. In terms of generating pulses for length measurement, however, this reversal process has only returned the pulse train to the initial point X, just after the seventh pulse. Consequently, the counter BC should have a pulse count of four corresponding with the four non-carry transitions of waveform 10.

Figure 3:
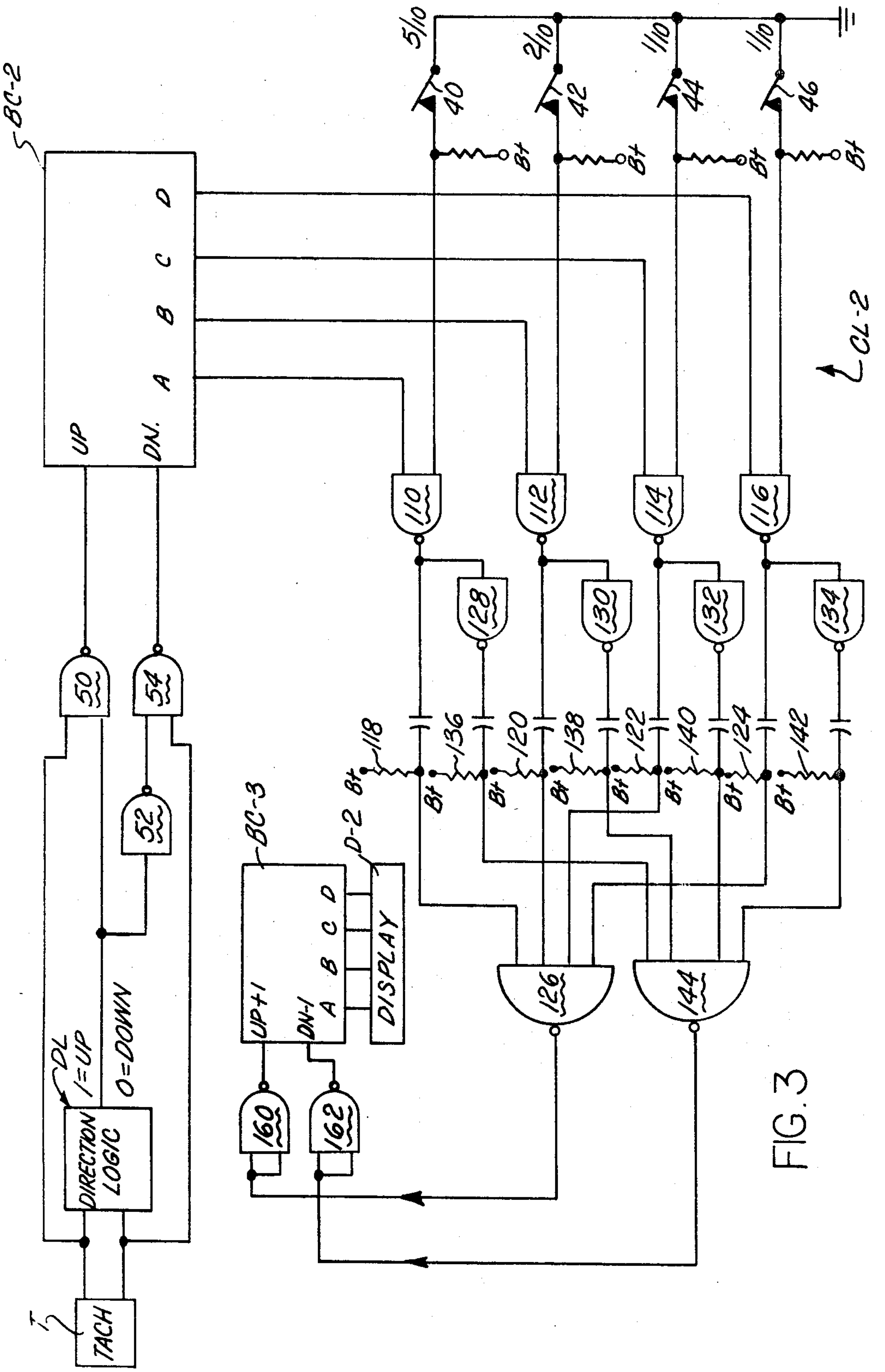
FIG. 3 is a combined block diagram-schematic illustration of one embodiment of the digital rate multiplier constructed in accordance with the present invention.
Figure 4:
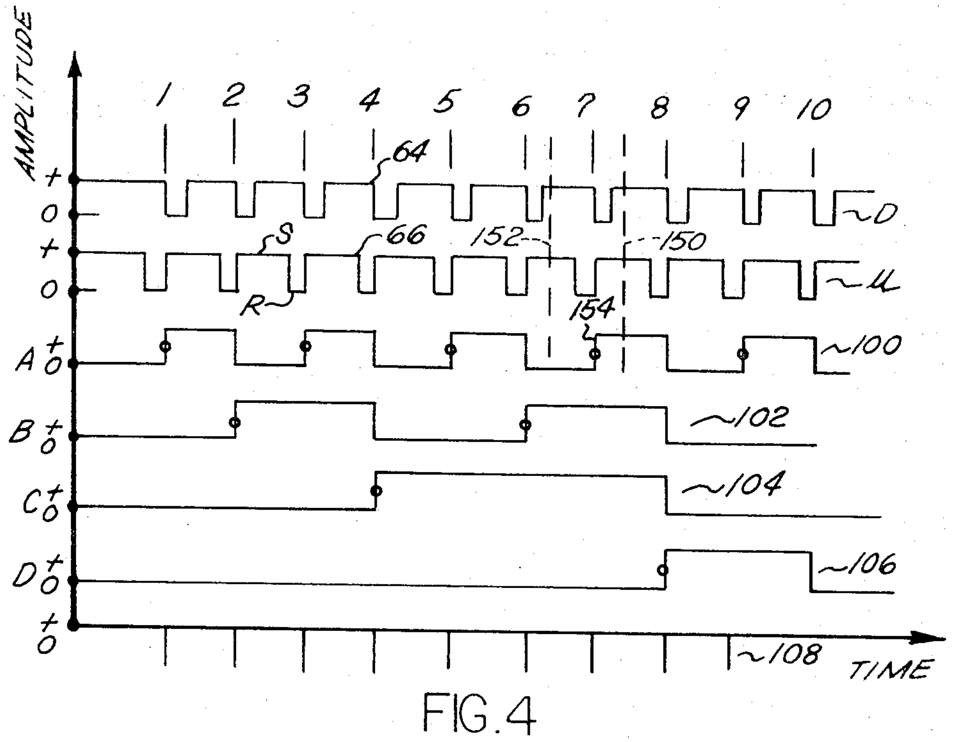
FIG. 4 is a graphical illustration showing various waveforms indicative of the operation of the embodiment of the invention illustrated in FIG. 3.
Figures 6, 8:
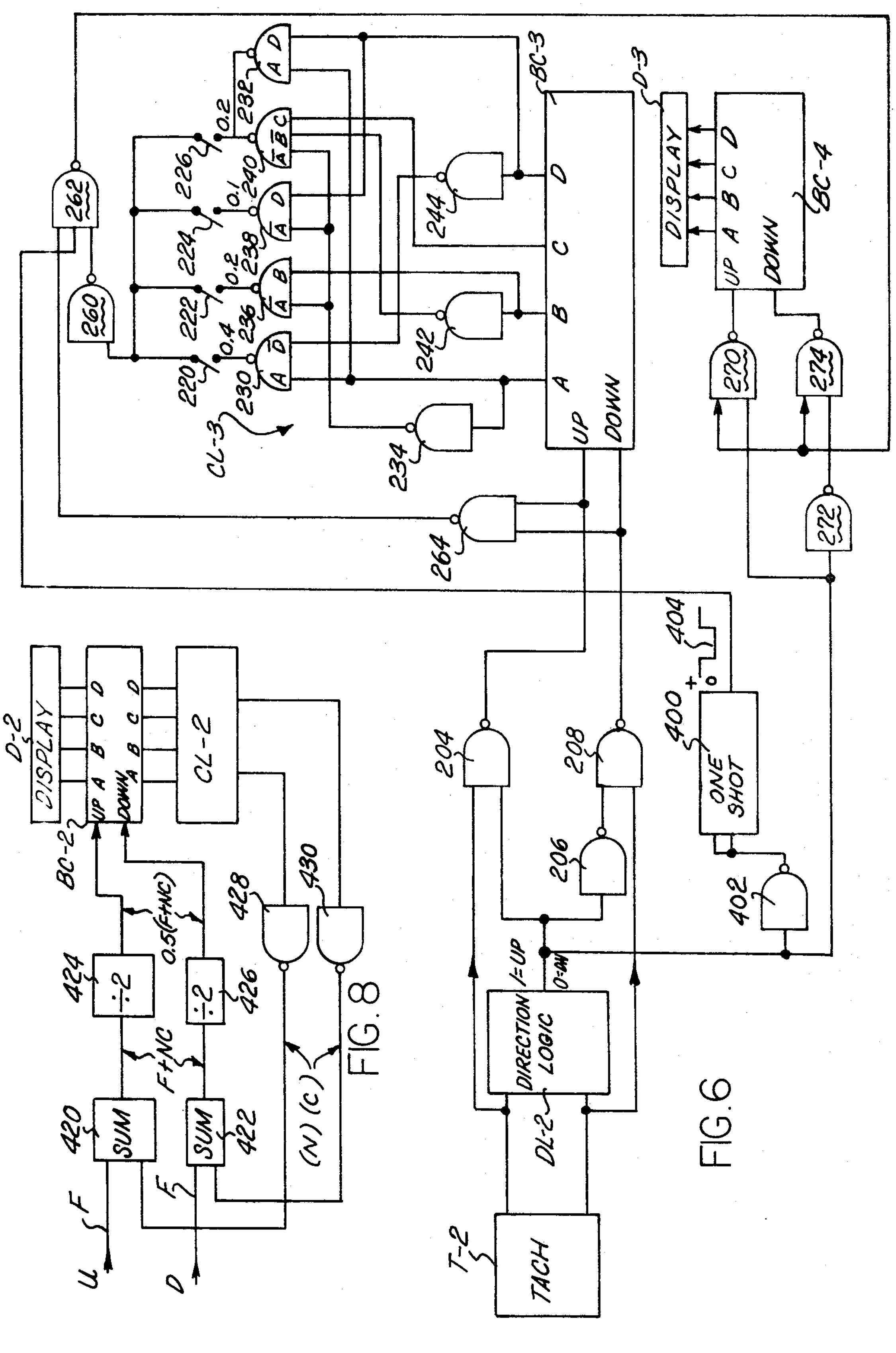
FIG. 6 is a combined schematic-block diagram illustration of a second embodiment of the digital rate multiplier constructed in accordance with the present invention.
Figure 7:
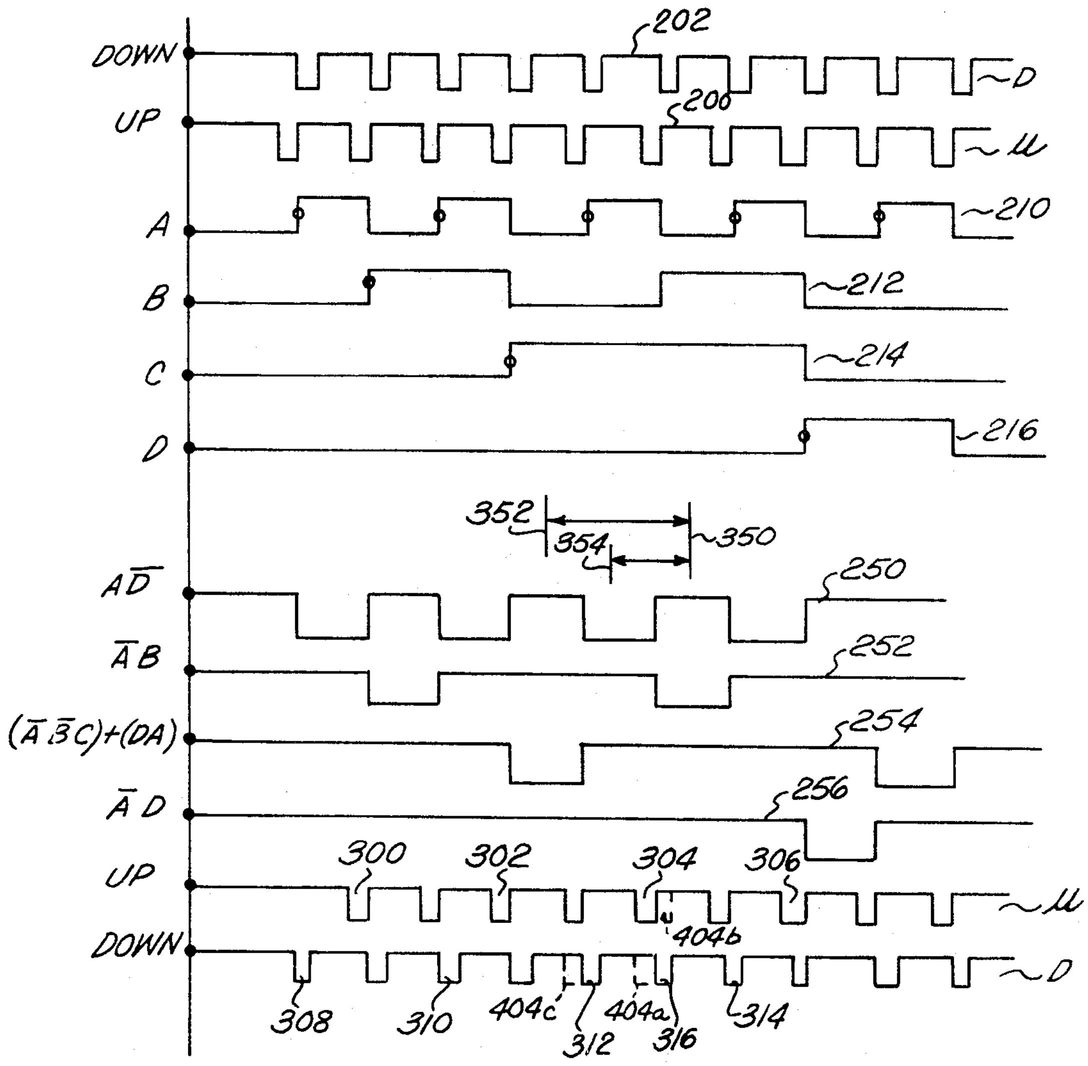
FIG. 7 is a graphical illustration showing various waveforms indicative of the operation of the embodiment shown in FIG. 6; and, FIG. 8 is a block diagram illustration showing a modification in using the present invention.

The present invention is directed toward solving the problem noted by the provision of a bidirectional digital rate multiplier of which one embodiment is shown in FIG. 3 with its operation being illustrated in the waveforms of FIG. 4, and a second embodiment is shown in FIG. 6 with its operation being illustrated by the waveforms of FIG. 7.

FIRST EMBODIMENT

A first embodiment of the digital rate multiplier constructed in accordance with the present invention is illustrated in FIG. 3 and its operation is shown in the waveforms of FIG. 4 to which attention is now directed. The rate multiplier employs a conventional up/down bidirectional BCD counter BC-2, a calibration logic circuit CL-2 and a pulse direction logic circuit DL. The embodiment is shown for a single decade, it being understood that greater resolution may be obtained by increasing the number of decades of the up/down counter. The single decade up/down counter like counter BC of FIG. 1 employs four binary counting stages A, B, C and D which are cascaded and the output circuits of the four stages have decimal weights of 1, 2, 4 and 8, respectively. The calibration logic circuit CL-2 includes normally closed switches 40, 42, 44 and 46 which respectively serve a function similar to switches 18, 20, 22 and 24 of the rate multiplier shown in FIG. 1. Thus, these four switches 40, 42, 44 and 46 when respectively opened serve to multiply the input pulse train by a factor of 0.5, 0.2, 0.1 and 0.1. Immediately to the left of these switches in FIG. 3 there is shown a plurality of NAND gates which serve to detect the non-carry transitions of the waveforms on the output circuits of stages A, B, C and D of counter BC-2, and circuitry for determining whether or not the transitions are in the forward or reverse direction.

The rate multiplier is preferably used in conjunction with a pulse generator which provides two pulse trains of identical pulse rates with a fixed phase displacement. Various types of pulse generators may be employed for this purpose and, for example, a conventional two phase, rotary pulse generator may be employed. Such a generator is illustrated in FIG. 3 as tachometer T which, for example, may be connected through gearing to a roller over which sheet material passes. As the sheet material moves in a forward direction, the tachometer generates the two pulse trains, which may have a frequency on the order of 1,000 pulses per second. One of the pulse trains may be referred to as the up pulse train U and the other may be referred to as the down pulse train D, with the down pulse train lagging the up pulse train by 90°. These two pulse trains are illustrated in the upper portion of FIG. 4. The direction logic circuit DL receives these two pulse trains and makes a comparison to determine whether the pulse trains are indicative of forward movement or backward movement. If the determination indicates that forward movement is involved, then the output circuit of the direction logic circuit DL will carry a binary 1 signal and, conversely, if the determination is that the pulse trains are representative of a backward direction then the output circuit will carry a binary 0 signal. If the detected movement is a forward direction, then the up pulses U will be routed to the up input of the bidirectional BCD counter BC-2. The down pulses will not be passed to the down input of the counter. Conversely, if the direction determination is representative of a backward direction then the down pulses will be routed to the down input of the BCD counter. For example, if the output circuit of the direction logic circuit DL carries a binary 1 signal then NAND gate 50 will be enabled so as to pass the up input pulses to the up input of the BCD counter. However, the binary 1 output signal from the direction logic circuit is inverted by NAND gate 52 so as to apply a binary 0 signal to NAND gate 54 and thereby inhibit this gate so that the down pulses will not be passed to the down input of the BCD counter.

Figure 5:
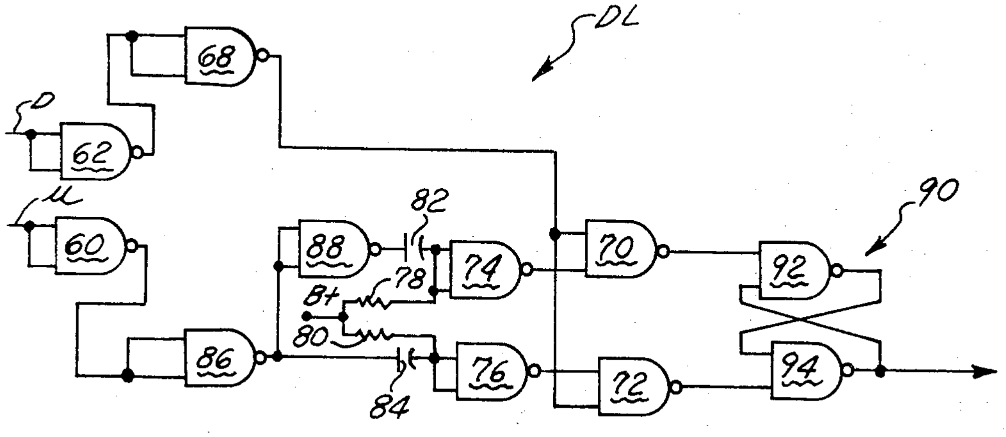
FIG. 5 is a schematic illustration of a direction logic circuit employed in practicing the invention.

The direction logic circuit DL is shown in greater detail in FIG. 5 to which reference is now made. The up input pulses U are applied to a NAND gate 60 and the down input pulses D are applied to a NAND gate 62. Basically, the circuit functions by noting a point in time that one of the pulses in the down pulse train D is positive, or high, and then looking at the transition in the corresponding pulse in the up pulse train U. If the corresponding pulse in the up pulse train undergoes a transition from a high level to a low level then the pulse trains are representative of a forward direction, and the up input to the BCD counter should be activated. Conversely, if the corresponding pulse in the up pulse train undergoes a transition from a low level to a high level this is indicative of a backward direction and, hence, the down input of the BCD counter should be activated. As stated previously, if the determination is a forward or up direction then the output circuit of the direction logic circuit DL will carry a high or binary 1 signal and, conversely, if the determination is a backward or down direction then the output circuit will carry a low or binary 0 signal. The manner in which the direction logic circuit operates is described below.

The down pulse train D is applied to NAND gate 62 and the up pulse train U is applied to NAND gate 60. A determination as to the direction of the pulse trains will be made when the waveform 64 of the down pulse train D is positive. (see the waveforms 64 and 66 for the down and up pulse trains in FIG. 4.) For example, between the second and third negative going pulses in the waveform 64 of pulse train D, the down pulse is positive. The determination to be made is whether the corresponding up pulse undergoes a transition in a negative direction from points S to R representative of forward motion or from R to S representative of backward motion. Since pulse train D is now positive a binary 1 signal is applied to NAND gate 62 which, in turn, applies a binary 0 signal to NAND gate 68. NAND gate 68 in turn now applies an enabling binary 1 signal to each of the NAND gates 70 and 72. The other input to NAND gates 70 and 72 is a binary 0 signal obtained respectively from NAND gates 74 and 76. This is because the inputs of NAND gates 74 and 76 are referenced to a B+ or binary 1 signal level through resistors 78 and 80, respectively. As will be described in greater detail hereinafter, resistor 78 and capacitor 82 form a differentiating circuit for NAND gate 74 and similarly, resistor 80 and capacitor 84 serve as a differentiating circuit for NAND gate 76.

If the up pulse train U undergoes a transition from point R to point S, i.e. a low level to a high level, then the binary 1 signal will be applied to the input of NAND gate 60 which, in turn, will apply a binary 0 signal to the input of NAND gate 86. NAND gate 86 in turn will now apply a binary 1 signal to NAND gate 76 and this is ineffective to change the state of the output of this NAND gate. However, the binary 1 signal obtained from NAND gate 86 is also applied to NAND gate 88 whose output is now changed from a high to a low level as it undergoes a tansition from a binary 1 signal level to a binary 0 signal level. This negative going transition is differentiated by the RC circuit comprised of resistors 78 and capacitor 82 so that a momentary negative or binary 0 signal is applied to the input of NAND gate 74. Consequently, the output circuit of NAND gate 74 will now change state to momentarily apply a binary 1 signal to the second input of NAND gate 70. Since NAND gate 70 had been enabled by a binary 1 signal obtained from NAND gate 68 the output circuit of NAND gate 70 will now change state from a binary 1 level to a binary 0 level. This binary 0 signal is now applied to an RS type flip-flop circuit 90 comprised of NAND gates 92 and 94. The binary 0 signal obtained from NAND gate 70 is applied to one input of NAND gate 92 and this will cause the output circuit of NAND gate circuit 92 to carry a binary 1 signal and since NAND gate 94 is enabled by NAND gate 72 the output circuit of NAND gate 94 and hence of the flip-flop circuit 90 will now carry a binary 0 signal. The RS flip-flop will now lockup through the interconnections between NAND gates 92 and 94 so that the binary 0 signal level obtained from NAND gate 94 will remain constant so long as the detected motion continues to be in a backward direction.

Assume for the moment that the pulse trains are representative of forward movement and in the previous example during the period that the down pulse train is positive the up pulse train will undergo a transition from a high level to a low level, i.e. from points R to S. Consequently a binary 0 signal is applied to NAND gate 60 and the output of NAND gate 86 will undergo a transition from a high level to a low level. This negative going transition is differentiated by the RC circuit comprised of resistor 80 and capacitor 84 and a momentary negative or binary 0 pulse is applied to the input of NAND gate 76. NAND gate 76 now applies a binary 1 signal to NAND gate 72 which has been enabled by NAND gate 68. Consequently, the output circuit of NAND gate 72 now applies a binary 0 pulse to the input of NAND gate 94 causing the RS flip-flop to change state so that its output circuit now carries a binary 1 signal.

Reference is now made to the operation of the rate multiplier shown in FIG. 3. When the direction logic circuit DL provides a binary 1 signal indicative of an up direction, NAND gate 50 is enabled to pass the up pulse train U to the up input of the BCD counter BC-2. The waveforms of the signals carried on the output circuits of stages A, B, C and D are as shown by waveforms 100, 102, 104 and 106 in FIG. 4. The non-carry transitions of these waveforms are circled. If all of the calibrating switches 40, 42, 44 and 46 are open then nine pulses, as indicated by waveform 108 in FIG. 4, will be passed by the calibration logic circuit CL-2. Depending on the multiplication factor desired, one or more of the switches 40 through 46 is open. For example, if the desired multiplication factor is 0.5 then switch 40 is open so as to apply an enabling binary 1 signal to its associated NAND gate 110. With switches 42, 44 and 46 being closed they respectively apply binary 0 signals to their associated NAND gates 112, 114 and 116 so that these NAND gates are inhibited from passing pulses. The outputs of NAND gates 110 through 114 are respectively applied through RC differentiating circuits 118, 120, 122 and 124 to a NAND gate 126. Also, the outputs of NAND gates 110 through 116 are applied to inverting NAND gates 128, 130, 132 and 134 respectively. NAND gates 128 through 134 have their outputs applied through respective RC differentiating circuits 136, 138, 140 and 142 to a NAND gate 144. The logic circuitry serves to sense the non-carry transitions of waveforms 100, 102, 104 and 106 as well as to determine whether or not the pulse trains are in the forward or backward direction.

An example of the operation of the logic circuitry may be had from considering the operation when only switch 40 is open, for a multiplication factor of 0.5. With reference to the waveforms of FIG. 4, it will be noted that only the non-carry transitions of waveform 100 for decade stage A will be passed. Thus, with switch 40 open NAND gate 110 is enabled and with a forward direction of the pulse train each time the output circuit of stage A of counter BC-2 undergoes a transition from a low level to a high level, a non-carry transition will be gated through the NAND gate. Consequently, the output circuit of the NAND gate 110 will undergo a change in binary level from a binary 1 signal to a binary 0 signal, and this negative going signal is differentiated by differentiating circuit 118 to apply a momentary negative or binary 0 signal to one input of NAND gate 126. Since the other inputs of this NAND gate receive binary 1 signals from the associated differentiating circuits, the output of this NAND gate will now carry a momentary binary 1 signal. For a forward pulse train of ten pulses this circuit will pass through NAND gate 126 five non-carry transitions of waveform 100 in the form of five positive or binary 1 pulses.

If, for example, the input pulse trains are representative of a backward direction, then the down pulse train D is applied to the down input of the BCD counter BC-2. Again, in the example with switch 40 being opened, each of the non-carry transitions of waveform 100 for counter stage A is passed by NAND gate 110. However, these transitions will now be in a reverse sense in that the transitions will go from a high or binary 1 level to a low or binary 0 level. Consequently, the output signals taken from NAND gate 110 will undergo a change from a low level or binary 0 level to a high level or binary 1 level. This will not be passed by differentiator circuit 110 to NAND gate 126. However, this positive going change will be inverted by NAND gate 128 so that differentiating circuit 136 applies a momentary negative or binary 0 pulse to one input of NAND gate 144. Since all of the other input circuits to this NAND gate carry binary 1 signals, this NAND gate's output circuit will now change state to provide a momentary binary 1 signal. Consequently, during the down operation NAND gate 144 will for a series of ten input pulses, provide five count pulses.

During the operation of the digital rate multiplier a situation may evolve wherein the pulse trains reverse their direction. For example, if the pulse trains are in a forward direction, then with switch 40 open four non-carry transitions of waveform 100 will have been counted through a point in time indicated on the waveforms as point 150. If the pulse trains now reverse their direction to a point 152 then the output circuit of the direction logic circuit DL will carry a binary 0 signal and NAND gate 54 becomes enabled so that the down pulses D are gated to the down input terminal of the BCD counter BC-2. The count at this point in the BCD counter is representative of a decimal count of plus four since four non-carry transitions of waveform 100 have been counted. As the pulse train reverses in the backward direction the down pulses D are applied to the BCD counter and the non-carry transition indicated by edge 154 of the fourth pulse in waveform 100 will be a transition from a positive or high level to a low level. Consequently, the output circuit of NAND gate 110 will change state from a binary 0 condition to a binary 1 condition. This is inverted by NAND gate 128 so that the differentiating circuit 136 applies a momentary binary 0 pulse to the NAND gate 144. NAND gate 144 will now provide a down or subtract output pulse. Since gate 126 has passed four pulses the differential between these two output circuits will now be plus three pulses. As the pulse train again reverses from point 152 to the point 150 in the waveforms of FIG. 4, the direction logic circuit will apply a binary 1 signal to enable NAND gate 50 so that the up pulse train is applied to the up input terminal of the BCD counter BC-2. The non-carry transition indicated by waveform edge 154 now appears as a transition from a binary 0 level to a binary 1 level and differentiating circuit 118 applies a momentary binary 0 signal to NAND gate 126 so that its output circuit carries a momentary binary 1 pulse. If another up/down counter be connected to NAND gates 126 and 144 then this up/down counter would now correctly have a count status of plus four counts. The up and down pulses obtained from NAND gates 126 and 144 may be applied to various circuits for utilizing these pulses. For example, these pulses may be applied to another up/down BCD counter BC-3 connected to a suitable display D-2. If so, then with negative trigger pulses applied to the up and down input terminals of the counter, NAND gates 160 and 162 may be interposed between the rate multiplier and the BCD counter to invert the binary 1 output pulses.

SECOND EMBODIMENT

A second embodiment of the bidirectional digital rate multiplier constructed in accordance with the present invention is illustrated in FIG. 6 and its manner of operation is illustrated by the waveforms of FIG. 7. This digital rate multiplier, like that shown in FIG. 4, employs a direction logic circuit DL-2, a calibration logic circuit CL-3 and an up/down BCD counter BC-3. The direction logic circuit DL-2 takes the same form as shown in FIG. 5 and operates in the same manner. The input to the direction logic circuit DL-2 is taken from a bidirectional pulse generator, such as a tachometer T-2 which like the tachometer T of FIG. 3 provides two pulse trains of identical pulse rates, with one pulse train being displaced in phase by 90°. Again, these pulse trains may be referred to as the up pulse train U and the down pulse train D as indicated by the waveforms 200 and 202 respectively in FIG. 7. In this example, pulse train D lags pulse train U by 90° as was the case with the corresponding waveforms of FIG. 4. NAND gates 204, 206 and 208 respectively serve the same function as NAND gates 50, 52 and 54 in FIG. 3.

During the operation of the BCD counter BC-3, the output signals appearing at the output circuits of stages A, B, C and D take the form of waveforms 210, 212, 214 and 216, respectively. The non-carry transitions of these waveforms are indicated by the circles.

The digital rate multiplier of FIG. 3 is dynamic in the sense that it detects the non-carry transitions. The rate multiplier in FIG. 6 is static in that it detects the status of the binary signals obtained from output stages A, B, C and D of the BCD counter BC-3.

The calibration circuit CL-3 includes normally open switches 220, 222, 224 and 226 which respectively serve when closed to provide multiplication factors of 0.4, 0.2, 0.1 and 0.2. Stated otherwise, for every 10 clock pulses applied to the BCD counter four may be passed through switch 220, two may be passed through switch 222, one may be passed through switch 224 and two may be passed through switch 226.

The output circuits of counter stages A, B, C and D are connected to switches 220 through 226 through a plurality of NAND gates. Thus, the output circuit of counter stage A is connected to one input of a NAND gate 230 and to the input of another NAND gate 232. The output of stage A is inverted by a NAND gate 234 having its output applied to one input each of NAND gates 236, 238 and 240. The output circuits of counter stages B, C and D are similarly connected to NAND gates 230, 232, 236, 238 and 240, as shown in FIG. 6, and to inverting NAND gates 242, 244. The output signals passed through switches 220, 222, 224 and 226 when closed during the operation of the BCD counter are respectively illustrated by waveforms 250, 252, 254 and 256. For example, when only switch 220 is closed four negative pulses, as shown by waveform 250, will be passed through the switch for each series of ten input pulses. These negative pulses are inverted by a NAND gate 260 so as to apply a sequence of four binary 1 enabling pulses to a NAND gate 262. The input pulses applied to the counter BC-3 are inverted by NAND gate 264 to apply binary 1 pulses to the NAND gate 262 which is now enabled to pass four of these clock pulses. If the operation is in an up direction then four clock pulses corresponding with pulses 300, 302, 304 and 306 will be passed. If the operation is in a down direction then the four pulses to be passed would correspond with pulses 308, 310, 312 and 314. The operation is similar for different combinations of closed switches 220, 222, 224 and 226, as evidenced by the waveforms of FIG. 7.

The number of count pulses passed by NAND gate 262 represent the input pulse train multiplied by the selected multiplication factor, such as 0.4. Consequently, for an application requiring that four pulses be passed out of every ten, the four pulses are available from the output circuit of NAND gate 262. These pulses may be applied to various utilization means, as desired by the user of the rate multiplier circuit. For example, a visual display may be had with Nixie tubes, by passing the count pulses obtained from NAND gate 262 to another BCD counter. This may be implemented, as shown in FIG. 6, with up/down BCD counter BC-4 having its output circuits of decade stages A, B, C and D connected to a suitable visual display D-3. The control as to whether the pulses passed by NAND gate 262 should actuate the BCD counter in an up direction or a down direction may be achieved by connecting the output circuit of the directional logic circuit DL-2 to one input of an NAND gate 270 and through an inverting NAND gate 272 to one input of another NAND gate 274. The output circuits of NAND gates 270 and 274 are connected to the up and down inputs, respectively, of the BCD counter BC-4. In this configuration, the output circuit of NAND gate circuit 262 is connected to one input each of NAND gates 270 and 274. Consequently, when the pulse train is in the up direction, NAND gate 270 will be enabled by the direction logic circuit CL-2 so that the up pulses obtained from NAND gate 262 will be passed through NAND gate 270 to the up input of the BCD counter BC-4. Similarly, when the operation is in the down direction NAND gate 274 will be enabled so that those count pulses which have been passed by NAND gate 262 will be passed to the down input of BCD counter BC-4.

During the operation of the digital rate multiplier of FIG. 6, the input pulse trains may reverse direction. Assume that the operation had been in the up direction and only switch 220 is closed, and at time 350 (see FIG. 7) three up pulses corresponding with pulses 300, 302 and 304 have been passed by NAND gate 262 and counted by the BCD counter BC-4. The pulse train may reverse direction for a time corresponding with the gap between point 350 and point 352. If so, then the directional logic circuit DL-2 will have changed its output from a binary 1 state to a binary 0 state so that the down pulses will be applied to the down input of the BCD counter BC-3. In addition, counter BC-4 is now conditioned so that only the down pulses passed by NAND gate 262 will be applied to the down input of this BCD counter. During this passage of time, from point 350 to point 352, the up pulses are not passed by NAND gate 262. However, a down pulse 312 will be passed so that the BCD counter BC-4 will now have received three up pulse counts and one down pulse count leaving a count status of plus two counts. As the pulse trains again reverse their direction from the backward to the forward direction, the conditions reverse so that the up pulses are applied to the NAND gate 262 and the BCD counters BC-3 and BC-4. Consequently, as time passes from point 352 to 350 an up pulse corresponding with pulse 304 will be counted. The BCD counter BC-4 will receive another up pulse count so that its count status returns to the correct value of plus three counts.

Conceivably, during the reversing process a time period may elapse substantially less than that between points 350 and 352 such that in the previous example, up pulse 304 may have been passed so that up input and the down pulse 312 may not have been detected. This would be the case if the time period be between points 350 and 354. Circuitry is employed to prevent such a condition. The circuitry employed includes a one shot multivibrator circuit 400 interposed between the directional logic circuit DL-2 and NAND gate 262. One input to the one shot circuit 400 is taken directly from the output of the correction logic circuit DL-2 and a second input is taken from an inverting NAND gate 402. Each time the output circuit of the direction logic circuit changes state from a binary 1 condition to a binary 0 condition, or from a binary 0 condition to a binary 1 condition the one shot circuit 400 is actuated to provide a negative blanking pulse 404 which serves to disable NAND gate 262. The blanking pulse 404 has a time duration which is substantially greater than a count pulse, such as up pulse 304 or down pulse 312 (see FIG. 7). The blanking pulse is generated from the leading edge of the transition in the binary state of the output from the direction logic circuit DL-2. Consequently, in the example of a time reversal period from 350 to 354 the direction logic circuit DL-2 will note the change in pulse train direction and one shot circuit 400 will provide a blanking pulse to disable NAND gate 262. This first blanking pulse will be referred to as pulse 404a and is shown superimposed on the waveforms of FIG. 7 at down pulse 316. Consequently, down pulse 316 will not be passed by NAND gate 262 to the BCD counter BC-4. If the time elapsed in the backward direction terminates at point 354 and another reversal occurs, then another blanking pulse **404*b* is provided to prevent the next up pulse, in this case pulse 304, from being passed by NAND gate 262. Of course, in the example being illustrated, down pulse 316 would not have been passed by NAND gate 262 since this pulse is not available at a time when the output circuit of NAND gate 230** is low.

In the earlier example, the elapsed time period in the backward direction was from point 350 to point 352. The reversals would be noted by direction logic circuit DL-2 and the one shot circuit 400 would provide blanking pulses **404*b* and 404*c* to inhibit NAND gate 262. Consequently, both the up pulse 304 and the down pulse 312 are blanked and not passed by NAND gate 262.**

From the foregoing examples it is seen that a false count pulse will not be passed by NAND gate 262 during a reversal of the pulse trains.

MODIFICATIONS

In the descriptions given with respect to the first and second embodiments of the invention, reference was made to the manner in which the rate multiplier may be utilized. As illustrated in FIGS. 3 and 6 the output pulses from the rate multipliers are applied through logic circuitry to BCD counters BC-3 and BC-4, respectively, with each of these counters being provided with digital display means. If desired, the circuitry may be revised so that only one BCD counter is required to provide both the rate multiplier counting function as well as to provide the totalizing count to be displayed. Stated otherwise, BCD counters BC-3 and BC-4 may be eliminated and displays D-2 and D-3 may be associated with BCD counters BC-2 and BC-3 respectively. This may be accomplished by feeding the output pulses from the rate multiplier through a summing network where the pulses are summed with the input count pulses followed by a divider circuit which, in effect, divides the pulses applied to the BCD counter by a factor of two.

For example, with respect to the embodiment shown in FIG. 3, this feedback modification may take the form as shown in FIG. 8. Here, the up pulses from NAND gate 50 and the down pulses from NAND gate 54 are respectively applied to summing networks 420 and 422. The summing networks are followed by multiplier circuits 424 and 426 which may each take the form of a single stage, flip-flop circuit and a differentiating circuit which serve to provide one output count pulse for every two count pulses received. The output of circuit 424 is applied to the up input of BCD counter BC-2 whereas the output of circuit 426 is applied to the down input of the same counter. The output circuits of stages A, B, C and D of the counter are connected to the calibration logic circuit CL-2 in the same manner as shown in FIG. 3, with the up output pulses being obtained from NAND gate 126 and the down output pulses being obtained from NAND gate 144. If necessary these pulses may be inverted by NAND gates 428 and 430 prior to application to the summing networks 420 and 422 where the count pulses from the calibration logic circuit are summed with the input pulses from the up pulse train U and the down pulse train D.

The operation is indicated by the equations shown in the drawing of FIG. 8. For example, during the up operation the number of up pulses may be considered as input pulses F. The multiplying factor of for example 0.5 used in example when described the operation of FIG. 3 is a calibration factor which may be referred to as factor C. The total number of pulses counted (for example 10) by the pulse counter multiplied by the calibrated setting C (for example 0.5) provides an output pulse count of NC (in the example given this would be five pulses). These pulses are added to the input pulses F to form as an output F+NC. This pulse total is then divided by circuit 424 to obtain 0.5 (F+NC). Since 0.5 (F+NC) is equal to N, the effect of the calibration number on the total input pulses F received is N=F/(2—C). Consequently, the number displayed N is equal to the number of input pulses received multiplied by 1/(2—C). This multiplication factor 1/(2—C) may be referred to as the system calibration factor K. Since the calibration unit factor C may range from 0 to 1 the system calibration factor K will have a range from 0.5 to 1. This means that the number of pulses received per increment of measure (such as pulses per foot) may be no less than 1 and no greater than 2.

In addition to the modification as shown in FIG. 8, other modifications may be made to the circuitry disclosed herein. For example, the bidirectional pulse source need not take the form of a rotary tachometer but may take other suitable forms such as photocells or other sensors of movement together with suitable circuitry so as to provide two pulse trains corresponding with the up pulse train U and the down pulse train D described herein. Also, a single reversible pulse train may be provided along with a directional signal or manifestation as to the pulse direction (this could take the form of a second, phase displaced pulse train or a D.C. signal). If the directional signal be a positive D.C. signal for forward movement and a negative or ground D.C. signal for backward movement, then direction logic circuits DL and DL-2 may be omitted. Also, the counters described herein need not take the form of BCD counters and could well take the form of normal binary counters with or without cascaded stages.

Whereas the invention has been described herein with respect to preferred embodiments it is not limited to same since various modifications may be made without departing from the spirit and scope of the invention as defined by the appended claims.

What is claimed is:

1. A bidirectional digital rate multiplier comprising: up/down binary counting means for counting a train of count pulses and having a plurality of binary stages each having a non-carry output circuit, said output circuits providing non-carry transitions which are mutually exclusive in time during a counting interval and are of a direction dependent upon the counting direction of said counting means;

counter control means for selectively conditioning said counting means to count said received count pulses in an up direction or in a down direction;

logic circuit means connected to said non-carry output circuits for sensing said transitions of said plurality of said stages and including direction sensing means for detecting the direction of each of said sensed transitions; and, output circuit means providing a plurality of output pulses corresponding with the number of said sensed and direction detected transitions.

2. A bidirectional digital rate multiplier as set forth in claim 1, wherein said output circuit means includes gating means controlled by said direction sensing means to provide said output pulses.

3. A bidirectional digital rate multiplier as set forth in claim 1, wherein said direction sensing means respectively provides a first pulse and a second pulse each time a said sensed transition is in a first direction or a second direction.

4. A bidirectional digital rate multiplier as set forth in claim 3, wherein said output circuit means includes first and second gate means respectively responsive to said first and second pulses from said direction sensing means to correspondingly provide said plurality of output pulses.

5. A bidirectional digital rate multiplier as set forth in claim 4, wherein each of said first and second gate means has an output circuit so that the output circuit for said first gate means carries output pulses corresponding to and in number with said transitions in the first direction and the output circuit for said second gate means carries output pulses corresponding to and in number to said transitions in the second direction.

6. A bidirectional digital multiplier as set forth in claim 1, wherein said logic circuit means include a plurality of pulse gating means respectively connected to the output circuits of said plurality of binary counting stages, means for selectively enabling said plurality of pulse gating means so that each enabled gating means provides an output pulse corresponding to each non-carry transition on the output circuit of its associated counting stage.

7. A bidirectional digital rate multiplier as set forth in claim 6 including differentiating means connected to each of said gating means for providing an output pulse each time the associated gating means provides an output pulse representative of a non-carry transition in a first direction.

8. A bidirectional digital rate multiplier as set forth in claim 7 including a second differentiating circuit connected to each said gating means for providing an output pulse each time its said associated pulse gating means provides an output pulse representative of a non-carry transition in a second direction.

9. A bidirectional digital rate multiplier comprising: up/down binary counting means for counting a train of count pulses and having a plurality of binary stages each having an output circuit, said output circuits providing non-carry transitions which are mutually exclusive in time during a counting interval and are of a direction dependent upon the counting direction of said counting means;

counter control means for selectively conditioning said counting means to count said received count pulses in an up direction or in a down direction;

logic circuit means for sensing said transitions of at least one of said stages and including direction sensing means for detecting the direction of each of said sensed transitions, a plurality of pulse gating means respectively connected to the output circuits of said plurality of binary counting stages, means for selectively enabling said plurality of pulse gating means so that each enabled gating means provides an output pulse corresponding to each non-carry transition on the output circuit of its associated counting stage, first differentiating means connected to each of said gating means for providing an output pulse each time the associated gating means provides an output pulse representative of a non-carry transition in a first direction, second differentiating means connected to each said gating means for providing an output pulse each time its said associated pulse gating means provides an output pulse representative of a non-carry transition in a second direction, first and second pulse gating means each having a plurality of input circuits with the input circuits of said first output gating means being connected to the respective said first differentiating means associated with said plurality of pulse gating means and said second output gating means having a plurality of input circuits respectively connected to said respective second differentiating circuit means associated with said plurality of gating means, whereby said first and second output gating means provide first and second output pulse trains respectively including a number of output pulses corresponding in number to the number of pulses provided by the said respectively associated differentiating means, and output circuit means providing a plurality of output pulses corresponding with the number of said sensed and direction detected transitions.

10. A bidirectional digital rate multiplier as set forth in claim 9 including pulse inverting means interposed between each of said second differentiating means and the output circuits of said respectively associated pulse gating means.

11. A bidirectional digital rate multiplier as set forth in claim 1 wherein said counter control means includes direction logic circuit means for receiving two identical but phase displaced trains of input count pulses from a bidirectional pulse source and means for comparing said pulse trains to determine whether said pulse trains are in a forward direction or a reverse direction and providing an output signal exhibiting a characteristic in dependence upon the determined direction.

12. A bidirectional digital rate multiplier comprising: up/down binary counting means for counting a train of count pulses and having a plurality of binary counting stages each having a non-carry output circuit, each said output circuit carrying a binary signal of a binary level representative of the binary state of its associated counting stage during the counting operations;

counter control means for selectively controlling said counting means to count said count pulses in an up direction or in a down direction;

logic circuit means connected to said non-carry output circuits for monitoring the binary states of selected ones of said stages during the counting operation and providing a gate enabling signal each time the monitored stages exhibit preselected binary levels, output pulse gating means for receiving a train of pulses corresponding with said input train of count pulses and enabled by each said enabling signal to provide an output pulse so that during the counting interval the total number of output pulses correspond with the number of times said output gating means is enabled during the counting interval.

13. A bidirectional digital rate multiplier as set forth in claim 12 including means for inhibiting said output pulse gating means from being enabled by a said enabling pulse and thereby prevent passage of an associated output pulse each time the binary counting means is conditioned to reverse its direction of counting.

14. A bidirectional digital rate multiplier as set forth in claim 12 wherein said logic circuit means includes a plurality of gating means connected to different combinations of said binary counter output circuits so that each gating means provides a said enabling pulse each time an associated combination of said stages exhibit a particular pattern of binary states.

15. A bidirectional digital rate multiplier as set forth in claim 14 including selectively actuatable switching means for selectively connecting the output circuits of said gating means with said pulse gating means to vary the number of output pulses provided by said pulse gating means.

16. A bidirectional digital rate multiplier as set forth in claim 12 wherein said counter control means includes a direction logic circuit for receiving two trains of phase displaced count pulses and providing an output manifestation indicative of whether the pulse trains are representative of a forward direction or a backward direction, said direction logic circuit including means for monitoring one of said pulse trains for a particular binary level and sensing the direction of pulse transition of the corresponding pulse in the other pulse train to determine the direction of said pulse trains.

17. A bidirectional rate multiplier comprising: up/-down binary counting means for counting a train of count pulses and having a plurality of cascaded binary counting stages each having a non-carry output circuit, said output circuits providing non-carry transitions which are mutually exclusive in time during a counting interval and are of a direction dependent upon the counting direction of said counting means;

counter control means for selectively conditioning said counting means to count said received count pulses in an up direction or in a down direction;

logic circuit means connected to said non-carry output circuits for sensing the binary state of selected ones of said binary stages during the counting operation and providing a gate enabling signal each time said selected stage or stages exhibits a given binary state;

pulse gating means enabled by each said gate enabling signal to pass an input count pulse; and, output circuit means providing a train of said passed count pulses corresponding in number with the number of times said gating means is enabled during a said counting interval.

* * * * *

UNITED STATES PATENT OFFICE
CERTIFICATE OF CORRECTION

Patent No. 3,764,784 Dated October 9, 1973

Inventor(s) Lambert Haner; John Allen Gill

It is certified that error appears in the above-identified patent and that said Letters Patent are hereby corrected as shown below:

Change the assignee "Antron Manufacturing, Inc." to -- Avtron Manufacturing, Inc. -- .

Signed and sealed this 2nd day of April 1974.

(SEAL)
Attest:

EDWARD M.FLETCHER,JR.
Attesting Officer

C. MARSHALL DANN
Commissioner of Patents